Patented Feb. 20, 1934

1,947,570

UNITED STATES PATENT OFFICE 1,947,570

TREATMENT OF SODIUM CALCIUM CYANIDE

Edward J. Pranke, Bayside, N. Y., assignor to Grangers Manufacturing Company, Boston, Mass., a corporation of Massachusetts No Drawing. Application August 1, 1930
Serial No. 472,482

3 Claims. (Cl. 23—79)

This invention relates to a process for treating sodium calcium cyanide with liquid anhydrous ammonia to produce sodium cyanide and calcium cyanide.

The sodium calcium cyanide may be produced by methods described in my copending application Ser. No. 623,026, filed July 16, 1932, or by other means.

According to that application, when the elements calcium, sodium, carbon and nitrogen, or materials capable of producing these elements, are present in a reaction zone in the proportions of at least one atom of calcium, two atoms of sodium, four atoms of carbon and four atoms of nitrogen and are intimately mixed and heated to a temperature above 1350° C., preferably 1400° to 1450° C., sodium calcium cyanide will be formed according to the following equations:—

(1) $CaCN_2 + C + 2NaCN = Na_2Ca(CN)_4$.
(2) $CaC_2 + N_2 + 2NaCN = Na_2Ca(CN)_4$.
(3) $2(CaCN_2 + C) + 2Na = Na_2Ca(CN)_4 + Ca$.
(4) $CaC_2 + 2C + 2Na + 2N_2 = Na_2Ca(CN)_4$.

In accordance with the present invention, I mix the crude sodium calcium cyanide with liquid anhydrous ammonia. The ammonia will dissociate the sodium calcium cyanide and the sodium cyanide will pass into solution, while the calcium cyanide and other forms of calcium present will remain in the insoluble residue. The solution and insolubles may be readily separated by filtration, the ammonia evaporated from the solution, leaving substantially pure sodium cyanide, and the ammonia likewise evaporated from the insoluble residue, leaving a product containing a large percentage of calcium cyanide which may be either used as such as a fumigating material, or for other purposes, or may be converted to sodium cyanide, for example, by transposition with sodium carbonate, sodium hydroxid, sodium oxalate or other suitable salts, or may be converted to other cyanide derivatives by obvious means.

The ammonia evaporated as described may, of course, be recondensed and used again. Obviously, since evaporation and liquefaction are reciprocal operations, they may be accomplished simultaneously in practice in a suitable apparatus; as, for example, a vacuum evaporator, in which the solution from which the ammonia is to be evaporated is kept under partial vacuum while the ammonia vapor to be liquefied is compressed in what are ordinarily the "steam coils" of the same apparatus.

What I claim is:

1. The process of producing sodium cyanide from sodium calcium cyanide which consists in mixing the latter with liquid anhydrous ammonia, separating the solution from the insolubles, and separating the contained sodium cyanide from the solution.

2. The process of producing sodium cyanide and calcium cyanide from sodium calcium cyanide which consists in mixing the latter with liquid anhydrous ammonia, separating the solution from the insolubles, separating the contained sodium cyanide from the solution, and evaporating the ammonia from the said insolubles.

3. The process of producing sodium cyanide from sodium calcium cyanide which consists in mixing the latter with liquid anhydrous ammonia, separating the solution from the insolubles, separating the contained sodium cyanide from the solution, evaporating the ammonia from the insolubles, converting the contained calcium cyanide to sodium cyanide in aqueous solution by suitable means, and recovering the sodium cyanide from the aqueous solution.

EDWARD J. PRANKE.